Figure 1:
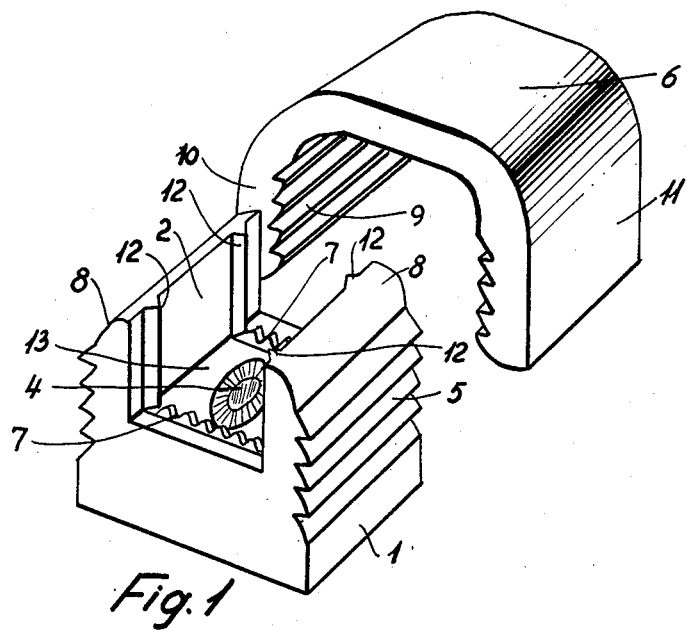

Dec. 1, 1959 C. C. KAYSING 2,915,267
WIRE HOLDER FOR FLEXIBLE ELECTRIC WIRES
Filed June 14, 1954

INVENTOR
Carl C. Kaysing
BY Watson, Cole, Grindle &
Watson
ATTORNEYS

United States Patent Office 2,915,267
Patented Dec. 1, 1959

2,915,267

WIRE HOLDER FOR FLEXIBLE ELECTRIC WIRES

Carl Christian Kaysing, Holte, Denmark

Application June 14, 1954, Serial No. 436,633

1 Claim. (Cl. 248—67.5)

This invention relates to a wire holder for flexible electric wires or cables, particlularly the so-called loose supply wires of electric lamps or other equipment.

It is often desired to hold such wires or cables in position along a panel or a wall, preferably in such a manner that the supply wires can be both mounted and detached in a simple manner by an unskilled person. The invention is primarily concerned with the problem of constructing a wire holder for this particular purpose, but it is observed however, that the wire holder according to the invention is not restricted to this particular use, but is of general application in all cases where it is desired to hold electric wires or cables in position either permanently, semi-permanently or temporarily.

Wire holders are known which comprise a base member formed with a U-shaped seat to receive a wire or wires, and a top member serving to clamp said wire or wires against said seat, said top member being provided with resilient leg portions provided with a plurality of ratchet teeth and adapted to be slid ratchet-fashion down along the side walls of said base member to engage the ratchet teeth thereof with the ratchet teeth of said base member, and to be disengaged from said base member by a pure sliding movement in the longitudinal direction of said ratchet teeth.

In the said known wire holders the seat of the base member is provided with projecting ribs adapted to prevent the wire or cable from sliding relative to the holder by penetrating slightly into the surface layer of the cable or wire.

Now it is often desirable to keep the wire or cable, mounted on wire holders of the kind referred to above, tightly stretched between the wire holders in question. However, the said projecting ribs on the seat of the base portion of the holder are not able to provide for a clamping action on the wire or cable being sufficiently effective to prevent the wire or cable from sliding in the holder if the wire is stretched. In order to remedy this drawback, the side faces of the base member facing the wire or cable located in the holder is constructed with projecting ribs extending transversely of the wire or cable and arranged to clamp the wire or cable between the ribs on opposed side faces of the base.

A wire holder according to the invention may similarly to the known wire holder referred to above be fitted with ribs projecting from the bottom walls of the U-shaped seat of the base member and extending transversely of the wire or cable located in said seat, and in order to increase the resistance of these ribs to a sliding of the wire or cable transversely of same, the surface of said projecting ribs on the bottom face of the base member may, according to the invention, be serrated or corrugated.

In the drawing

Figure 2:
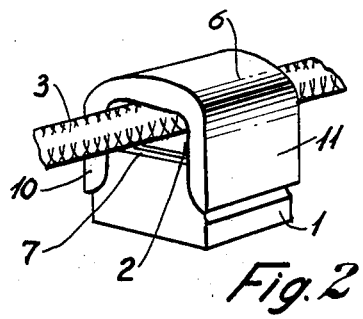

Fig. 1 is a perspective view of a wire holder according to the invention, showing the base member and the top member in disassembled relation, and Fig. 2 is a perspective view of the wire holder, in a smaller scale and in assembled position with the wire or cable clamped therein.

It should be understood that in this specification wherever the expressions such as "base" and "top" (or "up" and "down") are used, these expressions should be understood as merely referring to the location of the parts relative to the support on which the wire holder is mounted, the "base" member being located closer to the support than the "top" member etc. In other words, these expressions shall not be understood as implying any definite relative location of the parts in space.

The wire holder comprises a base member 1 and a top member 6 both of which may suitably be made from a transparent plastic material such as polystyrol. In the top surface of the base member there is formed a depression constituting a groove or seat 2 to receive one or more electric wires or cables 3. The seat 2 can suitably be constructed with projecting ribs 7 preventing the wire or cable from sliding relative to the holder by penetrating into the soft surface layer of the wire or cable. On the drawing the surface of said ribs 7 is serrated or corrugated, however instead thereof the said surface may be smooth if desired, as shown in Fig. 3.

The base member has a hole 4 for receiving a screw by means of which the base member can be attached to a wall, a panel or another structural part of a building on which the wire or cable is to be held in position. At its external side faces the base member 1 is provided with ratchet teeth 5.

The top member 6 is substantially U-shaped and adapted to be pressed down on to the base member so as to exert a clamping force on the wire or cable 3 resting in the seat 2. To avoid the possibility of the top member being presed down on to the base member in an inclined position, the base member is preferably constructed at its upper end with rounded guiding surfaces 8. The interior surface of the legs of the top member is provided with ratchet teeth 9 of a shape similar to that of the ratchet teeth 5 of the base member, and consequently, when the top member is pressed down on to the base member, the legs of the top member will be slid ratchet-fashion down along the sides of the base member 1 so that the teeth 9 and 5 will be engaged with one another to hold the top member in a position such that the wire or cable is firmly gripped between the two members.

The material of which at least the top member consists should of course have an elasticity such as to enable the legs of the top member to behave as resilient legs so that these legs can yield and thereby permit the described ratchet-like movement until the wire or cable has been firmly clamped.

Notwithstanding the firm engagement of the top and base members to securely clamp the wire or cable, it is very easy to disengage the top and base members from one another in case it is desired to detach the wire or cable from the wall or panel, e.g. when it is desired to change the layout or to clean the wall or panel. This disengagement is effected by a pure sliding movement of the top member relative to the base member in the longitudinal direction of the ratchet teeth. Thus, it is not necessary to disengage the ratchet teeth by urging the resilient legs of the top member away from the base member.

In order to obtain a firm clamping of the wire or cable 3 in the holder, the side walls of the base member facing the wire or cable when located in the seat 2 is provided with projecting ribs 12 facing the wire or cable and extending tranversely of same towards the bottom face 13 of the seat 2, and for the same purpose the surface of the ribs 7, projecting from the bottom of the seat may, if such ribs are used, be corrugated or serrated as shown in Fig. 1. The number of the ribs 12 and each side portion of the U-shaped bottom member may be any desired one, but ordinarily two ribs 12 on each side portion serve the purpose aimed at. In the embodiment shown, the said ribs 12 have a wedge-shaped cross-section, however they may have any other desired cross-sectional shape serving the purpose.

I claim:

A wire clamp comprising a substantially U-shaped bottom member adapted to receive a wire in the space bounded between its two side portions, each side having on its external unobstructed surface a number of mutually parallel projecting rectilinear ribs extending in a direction parallel to the base of said U-shaped member in a mutually equidistant relationship, and a substantially U-shaped top member having on the internal surface of its two side portions a number of mutually parallel projecting rectilinear ribs extending in a direction parallel to the base of said U-shaped top member in the same mutual equidistant relationship as the said external ribs on the side portions of the bottom member, the free space bounded between the ribs on the two internal surfaces of the side portions of the said U-shaped top members being less than the external width of the U-shaped bottom member measured across the two side portions of the bottom member whereas the said U-shaped top member is resilient in a direction transversely of the side portions of the same to permit the ribs on the internal surfaces of said portions to come out over the ribs on the external faces of the side portions of the said bottom members, when said top member is pushed over said bottom member, the said projecting ribs on the external surfaces of the side portions of said bottom member as well as the said projecting ribs on the internal surfaces of the side portions of the top member extending through the entire length of said side portions so as to allow the top member and the bottom member when interconnected to clamp a wire and also to be separated from one another by mutual displacement of said two members in a direction parallel to said ribs.

References Cited in the file of this patent

UNITED STATES PATENTS

| | | |
|---|---|---|
| 351,640 | Knapp | Oct. 26, 1886 |
| 784,979 | Bruce | Mar. 14, 1905 |
| 1,193,336 | Adams | Aug. 1, 1916 |
| 1,210,701 | Ryden | Jan. 2, 1917 |
| 2,542,350 | Paulsen | Feb. 20, 1951 |

FOREIGN PATENTS

| | | |
|---|---|---|
| 679,938 | Germany | Aug. 17, 1939 |